(12) United States Patent  
Baumann et al.

(10) Patent No.: US 8,387,729 B2
(45) Date of Patent: Mar. 5, 2013

(54) MACHINE HAVING ELECTRICAL POWER SYSTEM AND CENTERED DRIVE COUPLING FOR SAME

(75) Inventors: Jonathan Baumann, Peoria, IL (US); Perry Gene Cruce, Marquette Hts., IL (US)

(73) Assignee: Caterpillar Inc., Peoria, IL (US)

( * ) Notice: Subject to any disclaimer, the term of this patent is extended or adjusted under 35 U.S.C. 154(b) by 175 days.

(21) Appl. No.: 13/044,942

(22) Filed: Mar. 10, 2011

(65) Prior Publication Data

US 2012/0228043 A1    Sep. 13, 2012

(51) Int. Cl.
*B60K 6/46*    (2007.10)

(52) U.S. Cl. .............................. 180/65.245; 180/65.265

(58) Field of Classification Search ............. 280/65.245, 280/65.21, 65.28, 65.265, 65.235, 65.23, 280/65.25, 65.285; 477/5, 207
See application file for complete search history.

(56) References Cited

U.S. PATENT DOCUMENTS

| | | | |
|---|---|---|---|
| 4,730,713 A | 3/1988 | Pickard et al. | |
| 5,492,053 A | 2/1996 | Stonehill | |
| 5,773,904 A * | 6/1998 | Schiebold et al. | 180/65.25 |
| 5,899,461 A | 5/1999 | Yomogita | |
| 6,692,405 B2 * | 2/2004 | Minowa et al. | 477/5 |
| 6,708,808 B1 | 3/2004 | Andres | |
| 6,710,482 B2 | 3/2004 | Mackulin et al. | |
| 6,966,396 B2 | 11/2005 | Forsyth et al. | |
| 6,991,053 B2 * | 1/2006 | Kuang et al. | 180/65.235 |
| 7,040,474 B2 | 5/2006 | Pederson et al. | |
| 7,086,977 B2 * | 8/2006 | Supina et al. | 475/5 |
| 7,100,753 B1 | 9/2006 | Stafford | |
| 7,114,585 B2 * | 10/2006 | Man et al. | 180/65.21 |
| 7,268,442 B2 * | 9/2007 | Syed et al. | 180/65.25 |
| 7,275,610 B2 * | 10/2007 | Kuang et al. | 180/65.265 |
| 7,285,869 B2 * | 10/2007 | Syed et al. | 180/65.28 |
| 7,537,536 B2 | 5/2009 | Hvolka et al. | |
| 7,547,981 B2 | 6/2009 | Savant et al. | |
| 2003/0168306 A1 | 9/2003 | Gorman et al. | |
| 2003/0217903 A1 | 11/2003 | Ziemer | |
| 2005/0145460 A1 | 7/2005 | Forsyth et al. | |
| 2006/0000684 A1 | 1/2006 | Agner et al. | |
| 2008/0011574 A1 | 1/2008 | Yamasaki et al. | |
| 2008/0142330 A1 | 6/2008 | Agner et al. | |
| 2009/0054203 A1 | 2/2009 | Heeke | |

FOREIGN PATENT DOCUMENTS

| | | |
|---|---|---|
| JP | 2001025198 | 1/2001 |
| JP | 2008206467 | 9/2008 |
| WO | 0209258 | 1/2002 |

* cited by examiner

*Primary Examiner* — Hau Phan
(74) *Attorney, Agent, or Firm* — Liell & McNeil (57) ABSTRACT

A machine, such as an electrically powered track type tractor, includes an engine configured to rotate a generator. A drive coupling has a first element fixed to rotate with the engine and a second element fixed to rotate with the generator. The first and second elements are configured to rotationally couple together for transmitting torque from the engine to the generator, but configured to allow relative slip between the first and second elements. The relative slip may occur during engine start up as rotational rates pass through a range associated with the excitation of resonance torsional vibrations. A centering ring has a radial outer surface in contact with the first element and a radial inner surface in contact with the second element. The centering ring assists in avoiding an off center drive coupling arrangement while electrically isolating the first element from the second element.

20 Claims, 6 Drawing Sheets

MACHINE HAVING ELECTRICAL POWER SYSTEM AND CENTERED DRIVE COUPLING FOR SAME

TECHNICAL FIELD

The present disclosure relates generally to machines having electrical power generation systems, and relates more particularly to a centered drive coupling that is configured to inhibit transmission of electrical current and resonance vibrations between an engine and generator.

BACKGROUND

The combination of an internal combustion engine and a generator to produce electrical power has been known for many years. Relatively more recently, however, engine-driven generators have been used in electrically powered mobile machines to provide electrical power for propulsion and operation of other machine systems. In such strategies, rather than requiring relatively rapid ramp-up and down of engine output to accommodate changes in power demand, relatively more stable, smooth operation and transition across an engine power output range may be achieved. In other words, by powering some or all of the machine systems with electrical power provided by an on-board engine and generator system, combustion characteristics and overall engine operation can be more predictable and changes less rapidly. This allows wide and rapid swings in engine speed and load associated with changes in power demand on the system to be avoided. Where engine operation is more predictable, and changes in engine output more gradual, superior control over emissions and other factors such as fuel efficiency has been demonstrated as compared to traditional designs where an engine directly powered the machine propulsion system, hydraulics, etc.

In many machine systems where an engine directly drives a generator, vibrations and inertia associated with system operation can be transmitted between the engine and the generator. This can be particularly problematic where the generator inertia is fairly close to that of the engine. In some instances, resonance vibrations in the system can result in significant torque spikes within the system, at minimum wasting energy and roughening operation, and in certain instances even damaging components. While some system designs are sufficiently robust to withstand torque spikes when accelerating or decelerating through a speed range where resonance vibrations tend to occur, these systems can have other drawbacks, such as higher weight and cost.

One example of a machine having electrical power system is disclosed and co-owned U.S. Pat. No. 7,547,981. This reference teaches a drive coupling that allows some relative slip between rotation of the engine and rotation of the generator in order to accommodate resonance vibrations, such as those that might occur at engine start up. One potential problem associated with the machine of the '981 patent relates to the possibility of the drive coupling assembly not being properly centered. In such an instance, there is a potential for increased spring failure and wear, and increased bearing loading due to an eccentric relationship between the rotating engine and rotating generator.

The present disclosure is directed to one or more of the problems or shortcomings set forth above.

SUMMARY OF THE INVENTION

In one aspect, an electrical power system for a machine includes a generator configured to generate electrical power for the machine, and an engine configured to rotate the generator. A drive coupling has a first element fixed to rotate with the engine and a second element fixed to rotate with the generator. The first and second elements are configured to rotationally couple together for transmitting torque from the engine to the generator. The drive coupling is further configured to allow relative slip between the first and second elements. A centering ring has one of a radial outer surface and a radial inner surface in contact with the first element, and an other of the radial outer surface and the radial in surface in contact with the second element. The centering ring electrically insulates the first element from the second element.

In another aspect, a machine includes an engine mounted to a frame. A generator is configured to generate electrical power for the machine and is coupled with the engine. A drive coupling is configured to transmit torque between the engine and the generator, while also being configured to allow relative rotation between the engine and the generator. The drive coupling includes a centering ring with one of a radial outer surface and a radial inner surface in contact with a first element fixed to rotate with the engine, and an other of the radial outer surface and the radial inner surface in contact with a second element fixed to rotate with the generator. The centering ring electrically insulates the first element from the second element.

In still another aspect, a method of rotationally coupling an engine to a generator includes a step of mounting a centering ring on a coupling rim of a second element of a drive coupling. The coupling rim is maneuvered into a central opening of a piston of a first element. The coupling rim is centered in the piston by contacting an outer radial surface of the centering ring with a radial inner surface of the piston. The first element is electrically isolated from the second element. The first element is fixed to rotate with the engine, and the second element is fixed to rotate with the generator.

DETAILED DESCRIPTION

Figure 1:
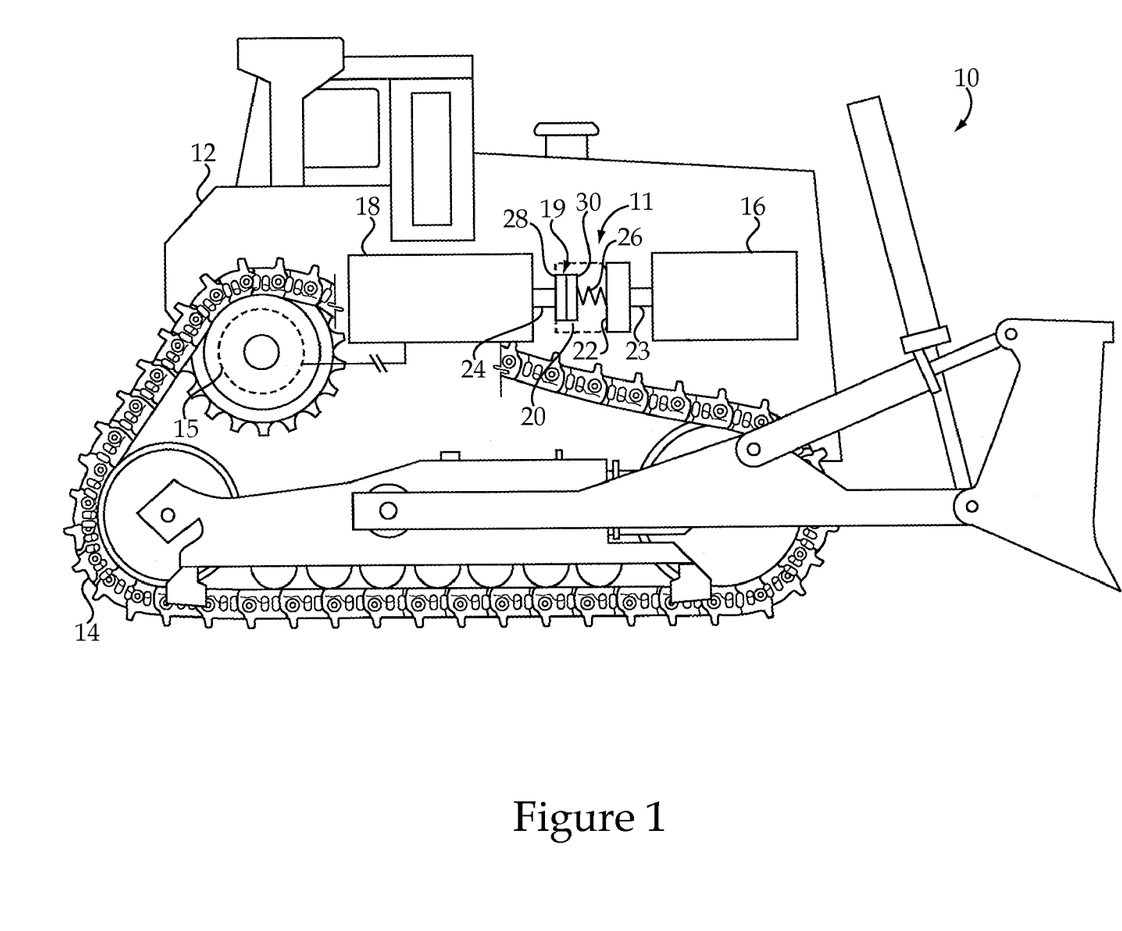
FIG. 1 is a side diagrammatic view of a machine having an electrical power system according to one embodiment.

Referring to FIG. 1, there is shown a machine 10 according to one embodiment. Machine 10 will typically include a mobile electric drive machine having a frame 12 with an electrical power system 11 mounted thereon. Electrical power system 11 may include an engine 16 configured to rotate a generator 18, which is configured to provide electrical power for machine 10. Machine 10 may further include a set of ground engaging elements such as tracks 14, only one of which is visible in FIG. 1, for propelling machine 10. Machine 10 will also typically include a drive coupling 20 configured for transmitting torque about a centerline 9 between engine 16 and generator 18. The drive coupling 20 has a configuration and operation providing advantages over earlier strategies, particularly with regard to machine component strain and operating smoothness, as further described herein.

At least one electric motor 15 may be further provided which is coupled with generator 18 and configured to drive tracks 14. Motor 15, together with tracks 14, drive coupling 20 and power system 11 comprises a propulsion system for machine 10. While machine 10 is shown in the context of a track-type machine of the type commonly used in construction, mining, forestry, road building, etc., the present disclosure is not thereby limited. It should accordingly be recognized that a wide variety of machines, mobile and stationary, may fall within the scope of the present disclosure. It is contemplated, however, that certain electric drive machines having relatively large power requirements and using relatively large generators driven by similarly large engines will be particularly benefited by implementation of the teachings set forth herein.

As alluded to above, drive coupling 20 is configured to transmit torque between engine 16 and generator 18. To this end, drive coupling 20 may be fixed to coupled with an engine flywheel 22, in turn driven by an engine output shaft 23. Rotation of flywheel 22 will rotate a generator input shaft 24 via drive coupling 20, in turn rotating generator 18 and generating electrical power in a conventional manner. In the embodiment shown in FIG. 1, output shaft 23 and input shaft 24 are illustrated in a coaxial configuration about a centerline 9. However, parallel axis gears, drive chains, belts, etc. might be used in embodiments where output shaft 23 and input shaft 24 are non-coaxially arranged. Moreover, for reasons that will be apparent from the following description, systems using conventional generators as opposed to other electrical power generating devices may be most apt to present problems advantageously addressed by the present disclosure. The term "generator," however, should not be so strictly limited as to exclude alternators and the like.

Generator 18 may include a speed range which includes a resonance speed associated with resonance vibrations of the generator/engine system. In one embodiment, rotating generator 18 at the resonance speed, for example at about 300-400 RPM, may result in torsional resonance vibrations being transmitted to drive coupling 20, from at least one of engine 16 and generator 18. Drive coupling 20 provides a means for inhibiting transmission of resonance vibrations between input shaft 24 and output shaft 23 and, hence, inhibiting transmission of such resonance vibrations between other components of power system 11. Inhibiting transmission of resonance vibrations as described herein is contemplated in particular to avoid high torque spikes resulting from inertia reflection/interaction between engine 16 and generator 18. This will provide a smoother transition through certain portions of the speed range of generator 18 than would otherwise be possible. Moreover, resonance vibrations tend not only to waste energy and strain components, but in some instances can actually render it difficult or impossible to accelerate or decelerate through a speed range that includes a resonance speed. In one embodiment, the resonance speed may lie in a lower portion of the speed range of generator 18, for example a portion of the speed range passed through during start-up of machine 10 and prior to reaching a generator speed sufficient for producing enough electrical power for ordinary machine operation. In other words, generator 18 may have a speed range that includes both of a start-up range, corresponding to an engine speed less than low idle, and a working range corresponding to engine speeds above low idle.

Those skilled in the art will appreciate that the resonance speed of generator 18 will typically be associated with generator internal inertia, as well as with other mass-elastic characteristics of power system 11. Relatively larger generators capable of outputting sufficient electrical power to drive construction machines and the like will tend to have relatively higher internal inertias. Such generators will accordingly tend to be associated with first harmonic frequency vibrations of a power system of which the generator is a part when rotated at relatively slower speeds than smaller generators. While changes in component stiffness and other machine characteristics may be used to tune the mass-elastic system and thus affect the magnitude of the generator resonance speed, the present disclosure is considered to provide a straightforward means of addressing harmonic vibrations without resorting to redesigning the machine system. To the extent that resonance speed might be tailored at all in the present context, it may be advantageous for the resonance speed or speed range to be set relatively low to permit the attendant problems to be dealt with during start-up conditions rather than in situations where machine 10 is actually performing work.

Inhibiting transmission of resonance vibrations between generator 18 and engine 16 when generator 18 is operated at the resonance speed (or within a resonance speed range) may be achieved by allowing non-oscillatory relative rotation between output shaft 23 and input shaft 24 via drive coupling 20. To this end, drive coupling 20 may be configured to permit relative slip between components thereof rather than transmitting torque induced by resonance vibrations. In particular, drive coupling 20 may include an engine element 25, which includes a reaction plate 30 fixed to rotate with engine 16, and a generator element 27, which may include an input shaft 24 coupled with a friction plate 28, fixed to rotate with generator 18 about a common centerline 9. When generator 18 is rotated at the resonance speed, friction plate 28 may slip relative to reaction plate 30, for example responsive to torque induced by resonance vibrations. A biaser 26 may be provided, having a spring force for example, which is configured to bias reaction plate 30 into engagement with friction element 28. In the illustrated embodiment, biaser 26 is a bellville washer. It should be appreciated that in other versions, friction plate 28 may slip relative to other machine components in addition to reaction plate 30. Also, rather than a spring, a fluid actuator or some other device might be used to bias the respective elements into engagement. It should further be appreciated that FIG. 1 is a schematic illustration only and the particular arrangement of components, e.g. which element is biased against which other element, etc. may differ from that which is illustrated in FIG. 1. This will be further apparent from the following description.

The aforementioned components, reaction plate 30, biaser 26, and friction plate 28 may be part of a passive clutch 19 having a clutch capacity defined at least in part by biaser 26. When a sufficient torque or a sufficient difference in torque is applied to drive coupling 20, a frictional force engaging friction element 28 with element 30 will be overcome and they will slip relative to one another to inhibit transmitting the torque through drive coupling 20. Although not readily visible, reaction plate 30 may be separated from friction plate 28 by a thin electrical insulating layer, such as by paper of a type known in the art. Engine 16 will have an output torque range, and biaser 26 may have a spring force defining a clutch capacity for clutch 19 that is higher than the output torque range of engine 16. This will allow drive coupling 20 to prevent relative rotational slip where engine 16 is operated within its normal output torque range, but inhibit transmitting torque larger than that for which engine 16, generator 18, or other components are rated, such as torques associated with resonance torsional vibrations. In other embodiments wherein an active clutch or the like is used, for example having a fluid actuator, relatively more precise control may be available, such that when resonance vibrations are detected or considered likely, for example, clutch pressure may be reduced to allow relative slip between the respective components. As used herein, "slip" refers to non-oscillatory relative rotation as opposed to such relative rotation as might be permitted by a spring coupling and the like. In an active clutch system according to the present disclosure, slip need not necessarily occur in response to resonance vibrations, but could instead be permitted at such time as generator 18 is determined to be entering a speed range where resonance vibrations are possible or likely.

Figure 2:
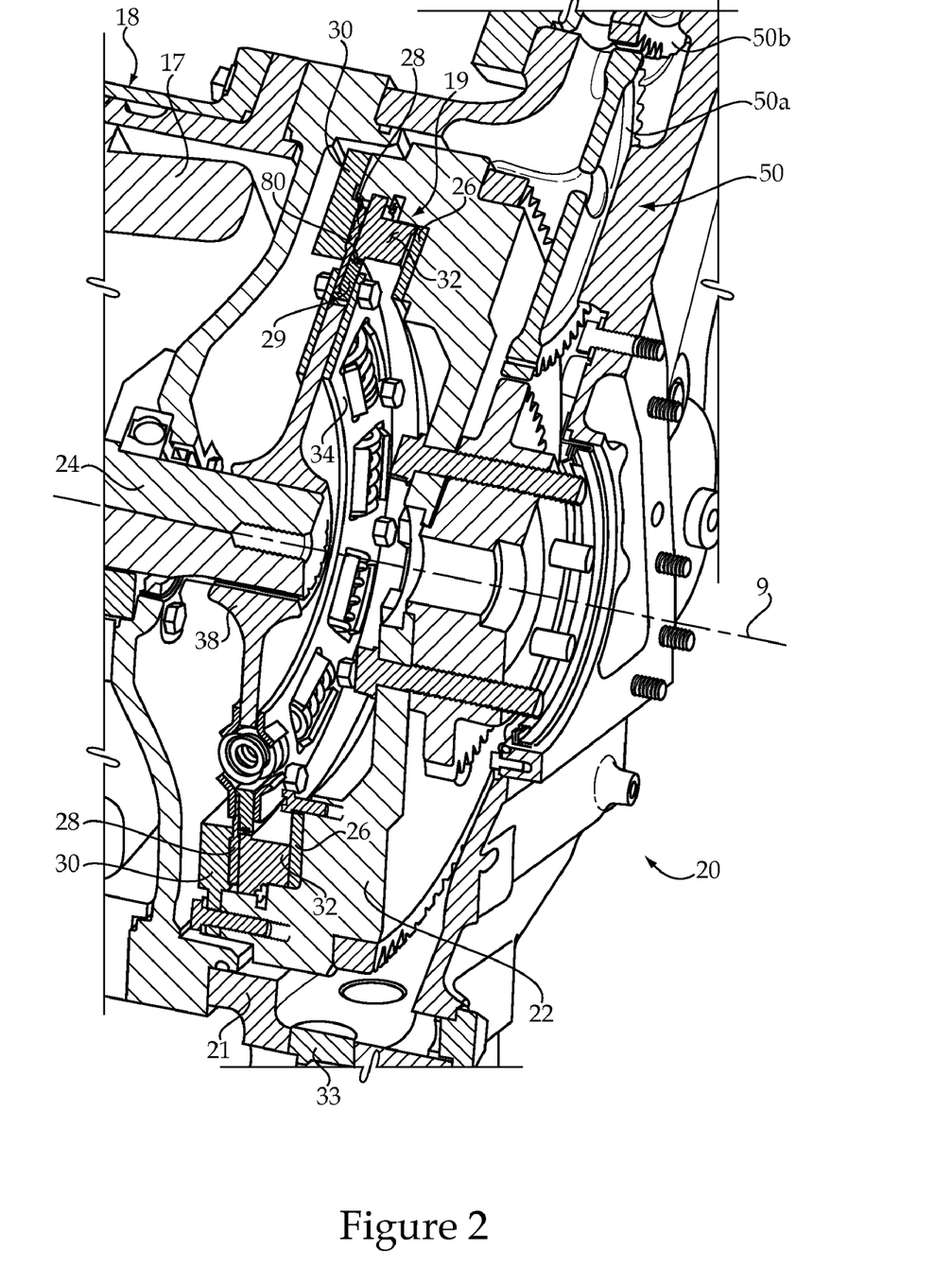
FIG. 2 is a sectioned side view, in multiple section planes, of a portion of a drive coupling according to one embodiment.
Figure 3:
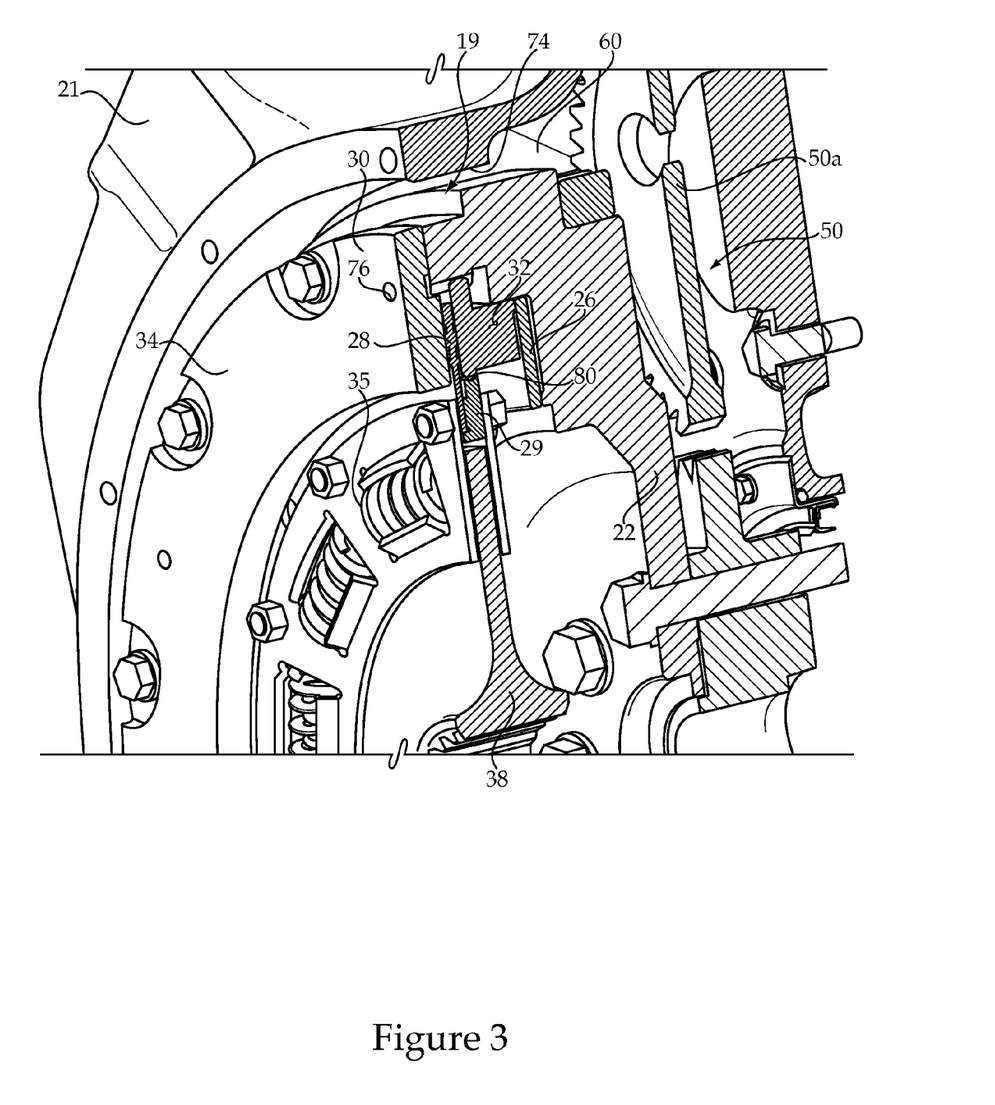
FIG. 3 is a different sectioned side view, also in multiple section planes, of a portion of a drive coupling similar to FIG. 2.

Turning now to FIGS. 2 and 3, there is illustrated one exemplary embodiment for drive coupling 20 showing certain of the internal components thereof, and also illustrating portions of generator 18 and a portion of its rotor 17. Drive coupling 20 may include a housing 21 having therein a geartrain 50 that includes a plurality of gears 50*a* and 50*b*. Housing 21 may be coupled with generator 18 and extend about flywheel 22 such that geartrain 50, flywheel 22 and various other components are housed within an enclosed environment. In particular, housing 21 may define an interior space 60 wherein the components are disposed which may consist of an oil mist environment. Machines such as machine 10 can operate in dusty or wet environments, and in some instances may submerge certain of their powertrain components in water. As such, an oil cooled system for clutch 19 and other components within housing 21 may provide a practical implementation strategy, although the present disclosure is not thereby limited and air cooling or some other cooling strategy might be used in other embodiments.

Referring in particular to FIG. 3, a geartrain oil supply passage may be disposed in gear 50*a*, and may connect with a plurality of distribution passages configured to fling oil into space 60 and onto various of the other components for cooling and lubrication thereof. A gap 74 may be defined by housing 21 and reaction plate 30, described herein, for allowing oil or oil mist to be passed from one side of reaction plate 30 to another. Another set of oil distribution passages may be positioned in flywheel 22 to permit oil or oil mist to pass through flywheel 22. Yet another set of oil passages 76 may be provided in reaction plate 30 itself. A scavenge point 33, shown in FIG. 2, may be provided for draining oil from housing 21 for subsequent cooling and redistribution.

Figure 4:
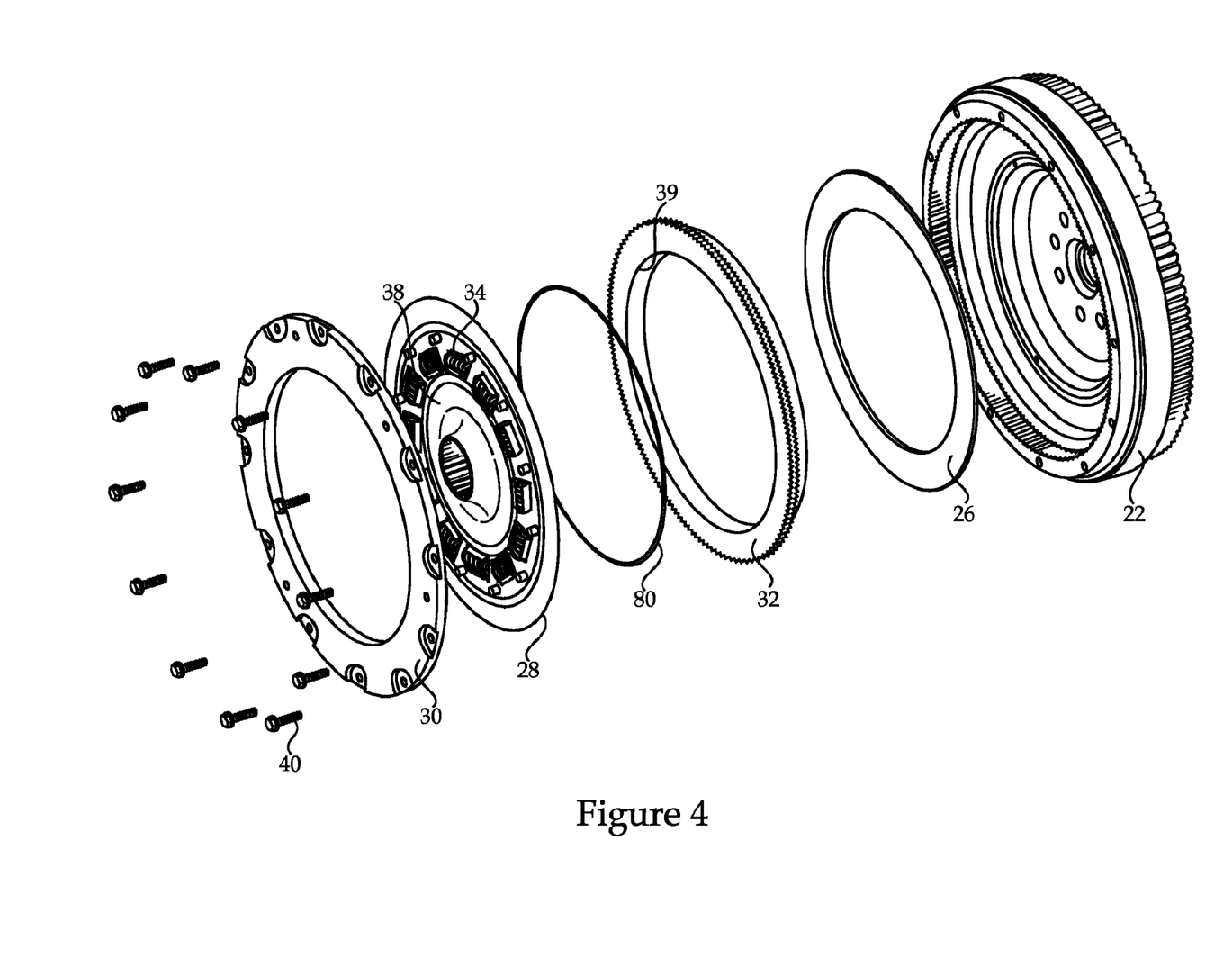
FIG. 4 is an exploded view of a portion of the drive coupling shown in FIGS. 2 and 3.

Referring also to FIG. 4, there is shown an exploded view of certain of the components of drive coupling 20. Reaction plate 30 may be coupled with flywheel 22 via a plurality of bolts 40. A spring or torsional coupling 34 may be attached to a hub adapter 38 and configured to mount on input shaft 24. Friction disc 28, piston 32 and a biaser 26 may all be coupled together via bolting reaction plate 30 to flywheel 22. Piston 32 may have a splined engagement with flywheel 22, and hub adapter 38 may also have a splined engagement with input shaft 24 when all the respective components are assembled in machine 10. It should be appreciated that the illustrated design for spring coupling 34 is exemplary only and a wide variety of other configurations might instead be used. In still other embodiments, a spring coupling might be omitted from the design.

Biaser 26 may consist of a Belleville spring compressed to exert its spring force against piston 32 and thereby sandwich friction disc 28 between piston 32 and reaction plate 30. Other spring types may be used. Biaser 26 may have a spring force defining a capacity of clutch 19, the clutch capacity being based on an output torque of engine 16, also as described herein. Friction disc 28 may be mounted on spring coupling 34 by any suitable means such as via bolts or splines and fixed to rotate therewith. In the illustrated embodiment, bolts join friction disc 28, coupling rim 29, spring coupling 34 and hub adapter 38. Spring coupling 34 may include a plurality of springs 35 and is configured to allow oscillatory torsional compliance between generator 18 and engine 16. In the presently described embodiment, piston 32 and reaction plate 30 will be fixed to rotate with flywheel 22, whereas hub adapter 38, spring coupling 34 and friction disc 28 are fixed to rotate with generator input shaft 24. When sufficient torque, caused by resonance vibrations of system 11 for example, is applied to hub adapter 38 by input shaft 24, friction disc 38 will slip, allowing non-oscillatory relative rotation ultimately between engine 16 and generator 18.

Figure 6:
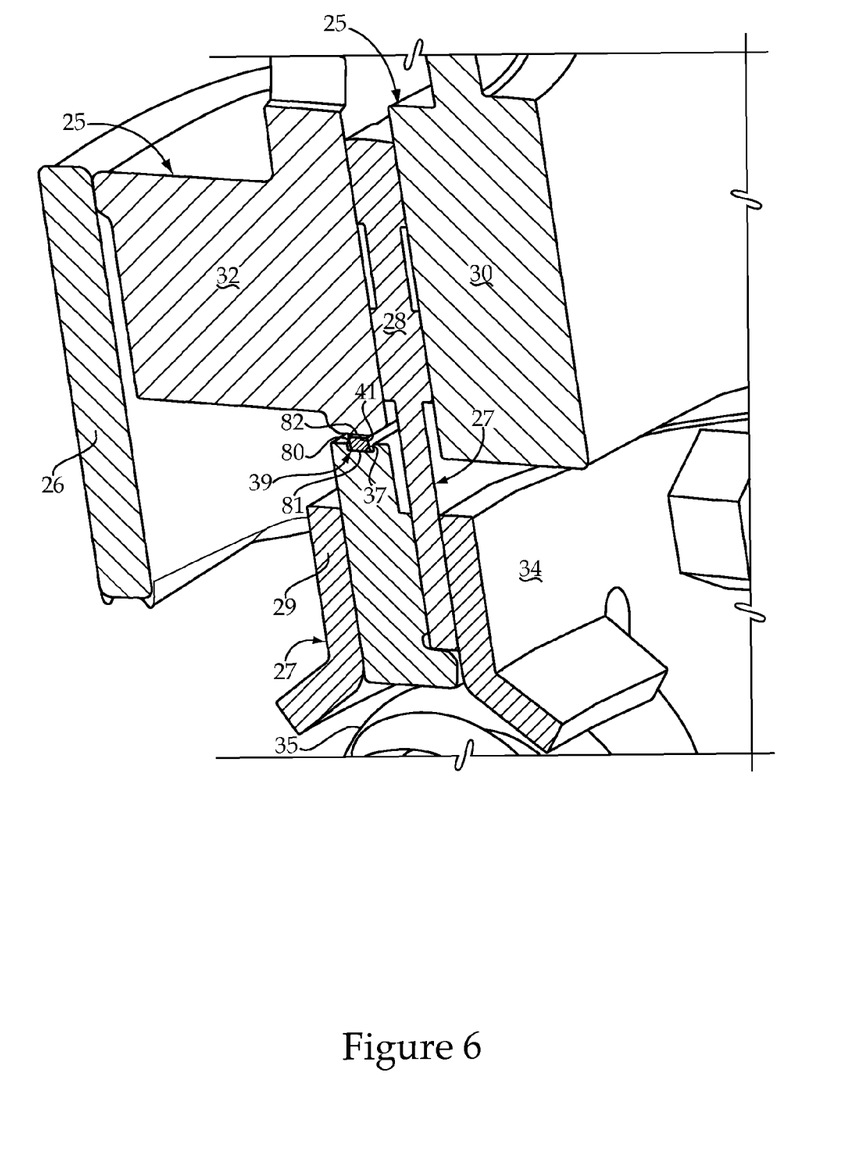
FIG. 6 is an enlarged sectioned perspective view of the drive coupling shown in FIGS. 2, 3 and 4.

In order to reduce unnecessary stresses due to asymmetry or eccentricity, the present disclosure includes a centering ring 80 that is co-axial about centerline 9 with both fly wheel 22 of engine element 25 and input shaft 24 of generator element 27. Due in part to the nested relationship of various components of drive coupling 20, centering ring 80 assists in reducing or avoiding an axial misalignment at time of assembly. Centering ring 80 may have a rectangular cross section with a thickness corresponding to a designed clearance distance between generator element 27 and engine element 25. In the illustrated embodiment, centering ring 80, which may be comprised of polytetrafluoroethylene, includes a radial outer surface 82 in contact with a radial inner surface 41 of piston 32, and a radial inner surface 81 in contact with a radial outer surface of a coupling rim 29, which is a portion of generator element 27. In particular, centering ring 80 may be received in a radial groove 37 defined by coupling rim 29 as best shown in FIG. 6. The radial groove 37 may have a depth that is less than the radial thickness of centering ring 80 so that a clearance remains between piston 32 and coupling rim 29 while centering ring 80 remains in contact with both components. However, by utilizing a centering ring having electrical insulating properties, such as polytetrafluoroethylene, the engine element 25 remains electrically isolated from generator element 27 so that stray currents produced by the generator 18 do not find there way to engine 16 via the drive coupling 20. It is also important to note that, although not required, centering ring 80 need not be fixed to either the engine element 25 or the generator element 27 and may thus have some ability to move within radial groove 37 along centerline 9 with respect to the walls that define the radial groove 37, and may also be free to slip about centerline 9 with respect to both piston 32 and coupling rim 29. Nevertheless, a centering ring fixed to one or the other of engine element 25 or generator element 27 would also fall within the scope of this disclosure. Although the present disclosure illustrates an embodiment where the generator element 27 is generally nested within the engine element 25, an opposite nesting configuration would also fall within the intended disclosure such that the centering ring outer surface would be in contact with the generator element and the radial inner surface would be in contact with the engine element, without departing from the present disclosure.

INDUSTRIAL APPLICABILITY

As discussed above, the first harmonic frequency of system 11 may be associated with a generator speed that is in a lower portion, for example a lower half, of a generator speed range, although the present disclosure is not thereby limited. Thus, in many embodiments, generator 18 will pass through the resonance speed during start-up and also during shutting down. It should further be appreciated that the present description of a resonance speed should not be understood to imply that only an exact generator RPM will be associated with resonance vibrations. Resonance vibrations may begin to build any time generator 18 is operated within a range of speeds. The particular timing of slip or other non-oscillatory relative rotation may depend upon torque resulting from torsional vibrations in the system rather than the actual generator speed. Hence, in some instances, the longer generator 18 is operated at a resonance speed, the greater the harmonic vibrations may become. Thus, whether and when drive coupling 20 will slip could depend not only on the particular generator speed but also upon how rapidly generator speed is increasing or decreasing. When a sufficient torque difference across drive coupling 20 is experienced, friction disc 28 will slip, inhibiting transmission the torque through drive coupling 20. In embodiments wherein an active clutch is used rather than passive clutch 19, slip within drive coupling 20 may be permitted by reducing clutch pressure, for example.

Figure 5:
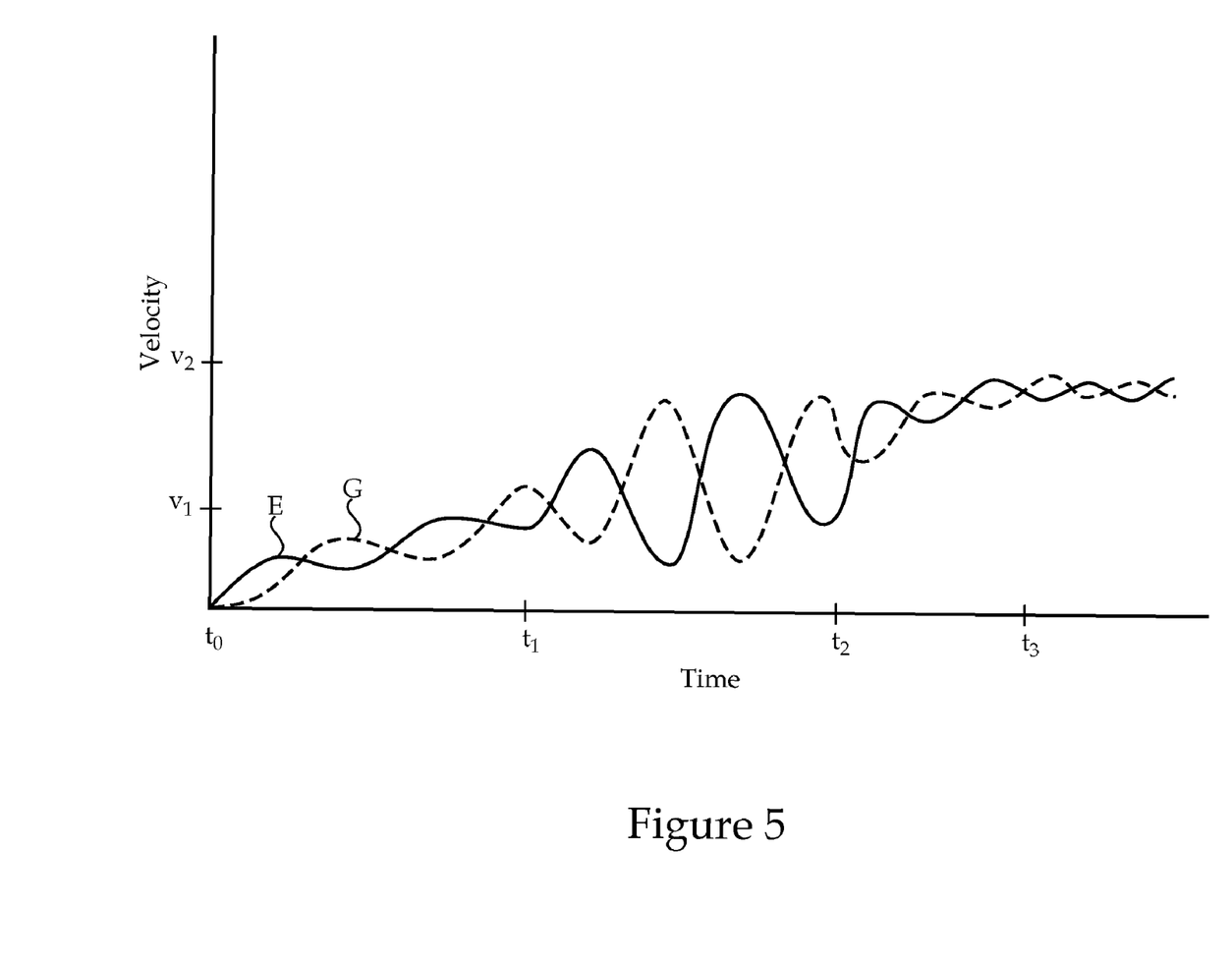
FIG. 5 is a graph illustrating engine speed relative to generator speed during machine/power system start-up according to one embodiment.

Turning to FIG. 5, there is shown a graph illustrating generator speed via line G and engine speed via line E during a typical start-up. At time $t_o$, engine 16 will begin to drive generator 18. Generator speed will typically increase in pace with engine speed. Eventually, generator 18 will begin to enter a speed range that is associated with resonance vibrations of the system, for example at about time $t_1$. As described herein, resonance vibrations may induce torque in the system, adding to or opposing the torque being output by engine 16, or alternately doing both. Where a difference in torque on the components of drive coupling 20 which are configured to slip reaches a threshold which can overcome the capacity of clutch 19, slip will occur. Slip within the system will tend to inhibit transmission of resonance vibrations between generator 18 and engine 16 and will consequently inhibit transmission of potentially damaging, annoying, wasteful and otherwise undesired torque and counter-torque to engine 16.

It should be appreciated that the graph of FIG. 5 is illustrative only and the generator and engine speed fluctuations may be somewhat exaggerated. In some instance, speed traces may not actually exhibit a readily identifiable point in time where slip and/or re-engagement of drive coupling 20 occurs. Where instead of speed, torque is monitored, torque spikes associated with systems not having drive coupling 20 would tend to be especially acute during a time period where resonance vibrations are occurring. With the use of drive coupling 20, such torque spikes will typically be truncated to lower magnitudes at times corresponding to slip within drive coupling 20.

It will be appreciated that when slip is occurring, engine 16 continues to drive generator 18, and average generator speed G may continue to increase despite speed fluctuations that may occur from resonance vibrations. Eventually, at approximately time $t_2$, generator speed G will have increased beyond a range where resonance vibrations tend to occur, and will eventually increase towards a more or less steady state corresponding to a low idle speed for engine 16 at about time $t_3$.

In many known systems, generators are used which either do not tend to experience or induce resonance vibrations within their operating speed range, or if they do, do not undesirably interact with other system components. In other instances, stiffness, mass properties, and torsional couplings may be tuned in an attempt to raise or lower the speed at which harmonic vibrations occur to place it outside of a normal speed range for a particular system. A shortcoming of such an approach is that new mechanical dynamics problems may be created. The present disclosure provides a straightforward means of addressing problems attendant to resonance vibrations without having to re-design system components. In other words, it is unnecessary to tailor component stiffness, mass properties and the like around a need for avoiding resonance vibrations. The use of a drive coupling 20 as described herein also enables spring coupling 34 to be used to tune the overall mass-elastic system apart from controlling generator resonance vibrations. Further, while the present disclosure is not strictly limited to an oil cooled strategy, it may be particularly applicable to oil cooled couplings as they tend to have relatively lower angular deflection limits than certain air cooled couplings, and are desirable in applications where the system may be at least partially submerged in water.

Referring especially to FIGS. 4 and 6, at the time of initial coupling of generator 18 to engine 12 by the assembly of drive coupling 20, there is a potential opportunity for some misalignment between the engine element 25 and the generator element 27. Apart from initial assembly, it may at times be necessary to disassemble drive coupling 20 for maintenance purposes, such as to gain access to the flywheel side of engine 12. Thus, generator 18 may be rotationally coupled to engine 12 by initially mounting centering ring 80 in a radial groove defined by a coupling rim of generator element 27. Assuming that the flywheel 22 is already installed in engine 12 and attached to the crank gear which is bolted to the engine crank shaft, the bellville biaser 26 is placed in flywheel 22 as shown in FIGS. 2 and 3. Next, the piston 42 is placed into flywheel 22 with the spline of piston 42 lining up with an inside diameter spline in flywheel 22. Next, the coupling rim 29 and its attached components, which include friction plate 28 spring coupling 34, springs 35 and hub adapter 38, are maneuvered into a central opening 39 of piston 42. This maneuvering step may be guided by a bevel 42 on the radial inner surface of piston 32. As the maneuvering continues, the coupling rim 29 will become centered in piston 42 by the contact between the radial outer surface 82 of centering ring 80 with the radial inner surface. The outer diameter of centering ring 80 should closely match the inner diameter of piston 32. Also, the inner diameter of centering ring 80 should closely match the diameter of coupling rim 80 should closely match the diameter of coupling rim 29 at the floor of radial groove 27. Although this assembly could occur when the engine is not horizontal, assembly is made easier when engine 12 is level so that the positioned components stay put before final fixation occurs. Next, the friction plate 28 is engaged by bolting reaction plate 30 to flywheel 22, thus capturing all of the parts. During this bolting process, bellville spring biaser 26 becomes compressed to create a predetermined clamping load on friction disk 28 between reaction plate 30 and piston 22. As stated earlier, both sides of friction disk 28 may include a thin layer of electrically insulating material, such as paper in order to electrically isolate generator 18 from engine 12 and inhibit stray currents from generator 18 from traveling to engine 12 via drive coupling 20. Next, the generator is splined into a inner diameter spline of the hub adapter 38 to fix generator element 27 to rotate with generator 18. Thus, centering ring 80 plays an important role in maintaining co-axial alignment along common centerline 9 between engine element 25 and generator element 27 during the critical period prior to fixation of the components when misalignment issues can develop. Furthermore, the presence of centering ring 80 during normal operation also serves to inhibit the development of a misalignment from occurring in the field.

The present description is for illustrative purposes only and should not be construed to narrow the breadth of the present disclosure in any way. Thus, those skilled in the art will appreciate that various modifications might be made to the presently disclosed embodiments without departing from the full and fair scope of the present disclosure. For instance, while the present disclosure focuses primarily on the use of a passive clutch, other means such as active clutches wherein clutch pressure can be varied to permit slip are contemplated. Further, in certain systems, rather than providing for slip some other means of permitting non-oscillatory relative rotation might be employed, for example alternately engaging and disengaging a drive coupling. Other aspects, features and advantages will be apparent upon an examination of the attached drawings and appended claims.

What is claimed is:

1. An electrical power system for a machine comprising:
   a generator configured to generate electrical power for the machine;
   an engine configured to rotate the generator;
   a drive coupling having a first element fixed to rotate with the engine and a second element fixed to rotate with the generator, the first and second elements being configured to rotationally couple together for transmitting torque from the engine to the generator, the drive coupling being further configured to allow relative slip between the first and second elements; and
   a centering ring with one of a radial outer surface and a radial inner surface in contact with the first element and an other of the radial outer surface and the radial inner surface in contact with the second element, and the centering ring electrically insulating the first element from the second element.

2. The system of claim 1 wherein the radial outer surface of the centering ring is in contact with the first element; and
   the radial inner surface of the centering ring is in contact with the second element.

3. The system of claim 2 wherein the centering ring is received in a radial groove defined by a coupling rim of the second element.

4. The system of claim 3 wherein the radial groove has a depth less than a radial thickness of the centering ring.

5. The system of claim 4 wherein the centering ring has a rectangular cross section.

6. The system of claim 1 wherein the centering ring is rotatable about a central axis with respect to the first element and the second element.

7. The system of claim 1 wherein the centering ring is comprised of polytetrafluoroethylene.

8. The system of claim 7 wherein the outer radial surface of the centering ring is in contact with the first element;
   the radial inner surface of the centering ring is in contact with the second element;
   the centering ring is received in a radial groove defined by a coupling rim of the second element;
   the radial groove has a depth less than a radial thickness of the centering ring; and
   the centering ring is comprised of polytetrafluoroethylene and with a rectangular cross section.

9. A machine comprising:
   a frame;
   an engine mounted to the frame;
   a generator configured to generate electrical power for the machine and coupled with the engine;
   a drive coupling configured to transmit torque between the engine and the generator, the drive coupling being further configured to allow relative rotation between the engine and the generator;
   the drive coupling including a centering ring with one of a radial outer surface and a radial inner surface in contact with a first element fixed to rotate with the engine and an other of the radial outer surface and the radial inner surface in contact with a second element fixed to rotate with the generator, and the centering ring electrically insulating the first element from the second element.

10. The machine of claim 9 comprising a propulsion system for the machine which includes the generator, the engine and the drive coupling, and electrically powered ground engaging elements coupled with the generator which are configured to propel the machine.

11. The machine of claim 10 wherein the engine includes flywheel;
    the generator includes an input shaft; and
    the flywheel, the input shaft and the centering ring are coaxial.

12. The machine of claim 11 wherein the radial outer surface of the centering ring is in contact with the first element; and
    the radial inner surface of the centering ring is in contact with the second element.

13. The machine of claim 12 wherein the centering ring is received in a radial groove defined by a coupling rim of the second element;
    the radial groove has a depth less than a radial thickness of the centering ring; and
    the centering ring has a rectangular cross section.

14. The machine of claim 13 comprising an electric drive track-type tractor having a first track and a second track comprising the ground engaging elements, wherein the drive coupling further comprises a spring coupling configured to allow oscillatory torsional compliance between the output shaft and the input shaft and a friction disc configured to transfer torque between the output shaft and the input shaft, the friction disc further being fixed to rotate with one of the input shaft and the output shaft and configured to slip relative to the other of the input shaft and the output shaft to allow the non-oscillatory relative rotation.

15. A method of rotationally coupling an engine to a generator comprising the steps of:
    mounting a centering ring on a coupling rim of a second element of a drive coupling;
    maneuvering the coupling rim into a central opening of a piston of a first element;
    centering the coupling rim in the piston by contacting an outer radial surface of the centering ring with a radial inner surface of the piston;
    electrically isolating the first element from the second element;
    fixing the first element to rotate with the engine; and
    fixing the second element to rate with the generator.

16. The method of claim 15 wherein the step of fixing the first element to rotate with the engine includes clamping a friction disk of the second element between the piston and a reaction plate of the first element.

17. The method of claim 16 wherein the clamping step includes bolting the reaction plate to a flywheel of the engine.

18. The method of claim 17 wherein the centering step includes sliding the centering ring on the radial inner surface of the piston.

19. The method of claim 18 including a step of setting a clamping load on the friction disc by compressing a biaser between the piston and the flywheel during the clamping step.

20. The method of claim 19 wherein the step of fixing the second element to rotate with the generator includes spline mating a generator input shaft to a hub adapter of the second element.

* * * * *